United States Patent Office 3,251,029
Patented May 10, 1966

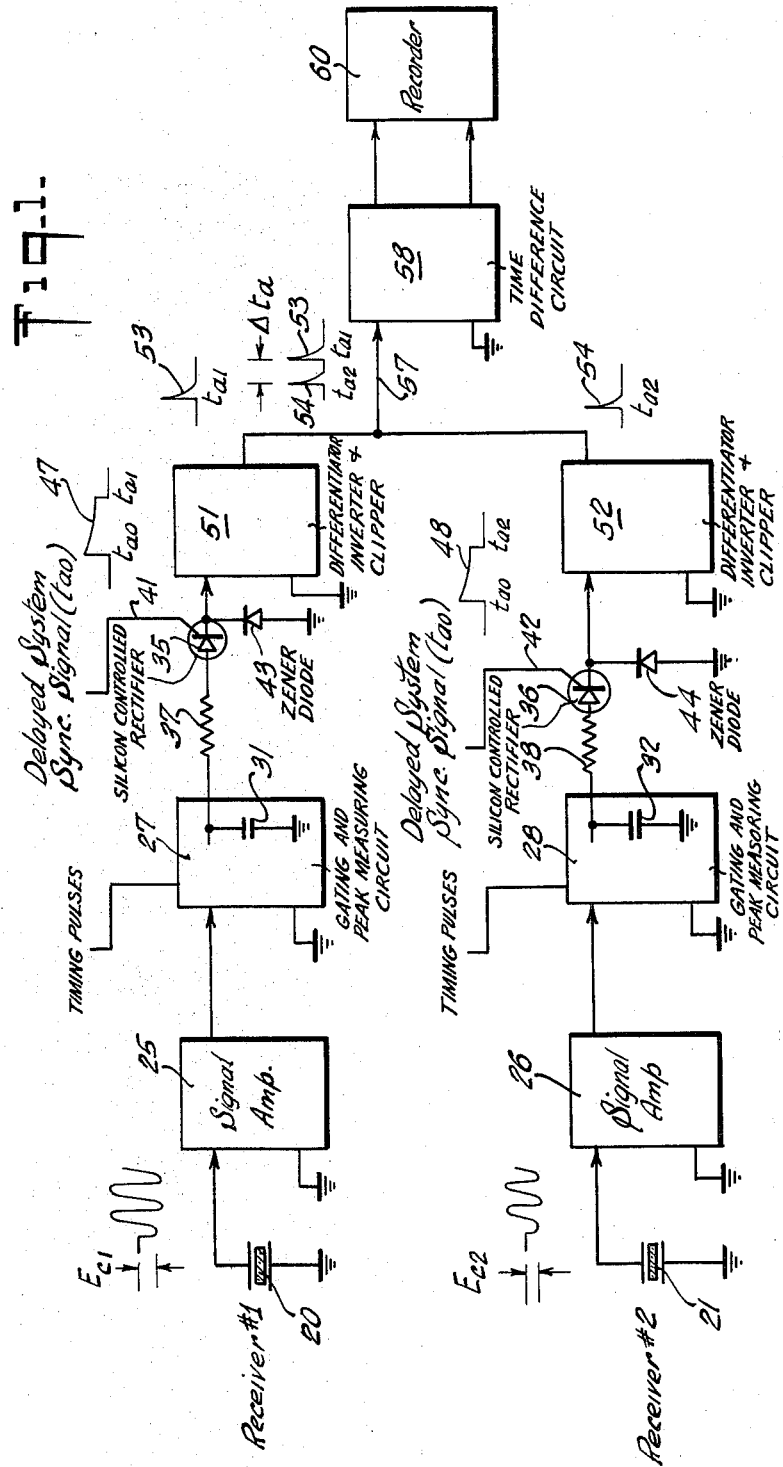

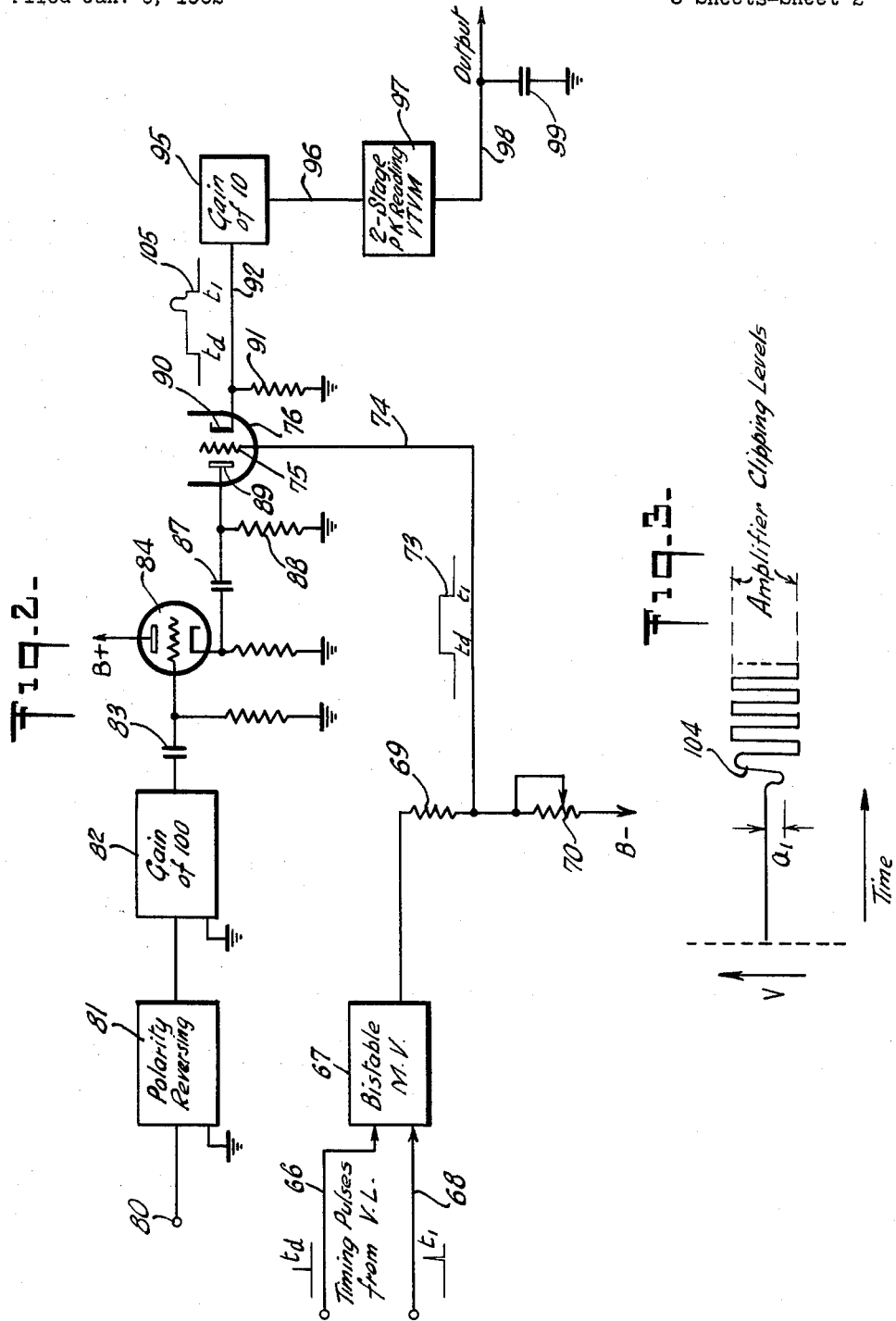

3,251,029
ACOUSTIC ATTENUATION WELL LOGGING
SYSTEM
Kerry D. Savage and Cloy N. Causey, Houston, Tex., assignors to Texaco Inc., New York, N.Y., a corporation of Delaware
Filed Jan. 8, 1962, Ser. No. 164,689
11 Claims. (Cl. 340—18)

This invention concerns acoustic well logging generally, and more specifically deals with improvements in attenuation type of acoustic borehole logging.

It has been recognized heretofore that the attenuation of an acoustic signal through the earth is a separate and distinct parameter from the velocity of the formation through which such signal passes. Consequently attenuation per se, is of considerable value in being an indicator that may be directly related to petroleum production possibilities, e.g. in locating gas zones and in locating fractured zones.

However, in attempting to make use of the attenuation in acoustic energy transmission, difficulties have arisen in connection with the ability to measure satisfactorily the attenuation which has taken place as an acoustic signal has passed through a given formation. One of the principal reasons for the difficulties involved is that related to the fact that a logging operation necessitates a long cable for connecting the logging instrument in the borehole with the surface. Such long cable connection creates various problems including one of the attenuation of signals passing through the cable itself.

Consequently it is an object of this invention to provide an improved attenuation borehole logging system.

Another object of this invention is to provide an attenuation type acoustic logging system that includes an arrangement for translating a short portion of the initial acoustic signal received from an amplitude signal into a time pulse that has a duration which is a logarithmic function of the amplitude.

Another object of this invention is to provide an improved gating circuit for use in any system where it is desired to pass only the first half cycle of an alternating signal so that the peak amplitude of such half cycle may be accurately measured.

Briefly, the invention concerns a system for use in acoustic well logging that employs a plurality of vertically spaced receivers. In such system the invention comprises the combination of circuit means for providing a voltage proportional to the peak amplitude of a predetermined early portion of each of the signals generated by said receivers. The combination also comprises means for transforming each of said voltages into a time pulse the duration of which is a logarithmic function of said voltage, and means for measuring the difference in time duration between two of said pulses in order to determine a direct measure of the attenuation of acoustic energy between the corresponding receivers, expressed in decibels.

Again briefly, the invention is concerned with a system for use in acoustic well logging wherein such system has a gated peak amplitude measuring circuit, which circuit comprises an electronic device having controlled unidirectional flow properties and including two principal current flow electrodes plus a control electrode. The measuring circuit also comprises means for applying a desired signal to the circuit containing said principal electrodes, said desired signal having polarity such that the initial half wave portion thereof will pass through said device. The circuit also comprises means for applying a gating control signal to said control electrode for conditioning said device to pass current only during a predetermined interval ending with the second half wave portion of said desired signal.

The foregoing and other objects and benefits of the invention, will be more fully appreciated in connection with the detailed example that follows and that is illustrated in the drawings in which:

FIGURE 1 is a schematic circuit diagram partially in block form illustrating a two receiver system according to the invention;

FIGURE 2 is a schematic circuit diagram illustrating in greater detail the gating elements that go to make up two corresponding blocks of the FIGURE 1 system;

FIGURE 3 is a diagram illustrating a typical wave form of one of the signal voltages after amplification thereof;

Figure 4:
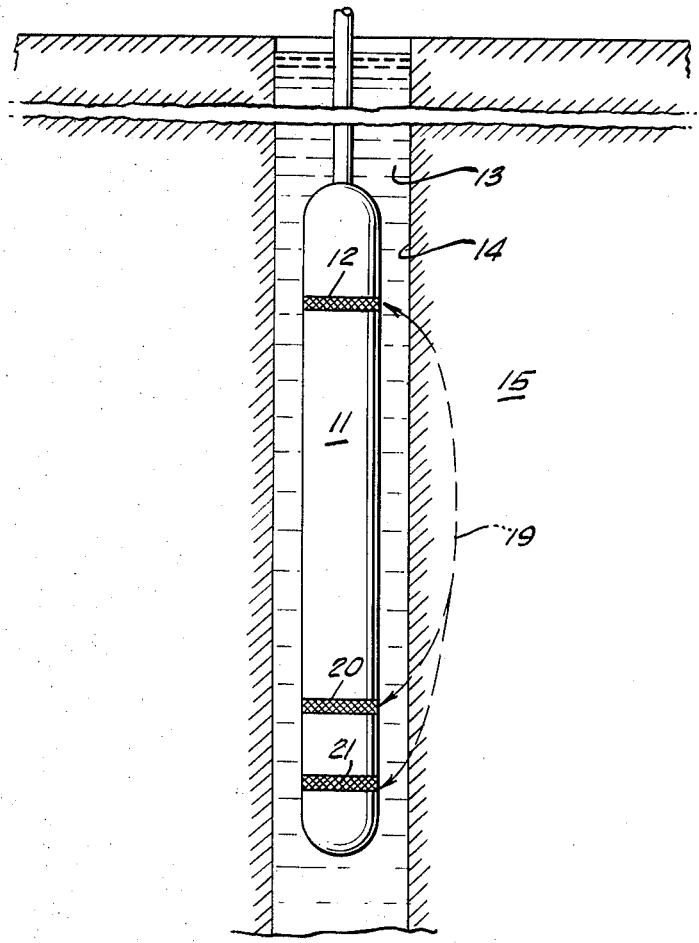
FIGURE 4 is a schematic diagram illustrating an acoustic logging instrument in a borehole.

Referring first to FIGURE 4, it will be observed that there is shown schematically a logging instrument 11 that has a transmitter 12 therein which generates periodic acoustic signals that will radiate outward in all directions and pass through whatever borehole fluid 13 exists in the borehole 14 and then into the surrounding formation 15 that lies at the adjacent location in the borehole. Such instruments are well known, e.g. see the U.S. patent to Loofbourrow, No. 2,931,455, issued April 5, 1960. Furthermore the phenomena involved are well known. Thus, acoustic energy will travel over a refracted path, e.g. a path 19 illustrated, and will emerge back into the borehole fluid 13 near the location of each of a plurality of acoustic energy receivers 20 and 21.

It will be appreciated by those skilled in the art that in order to measure the attenuation of acoustic energy travelling through a given formation, the signals generated by a pair of vertically spaced receivers (receivers 20 and 21) may be compared for amplitude difference and this will be a direct measure of the attenuation caused by the formation located vertically between receivers 20 and 21. However, as pointed out previously, the accurate measurement of amplitudes of such receiver generated signals is extremely difficult and has not heretofore been satisfactorily carried out. Consequently, as will appear below, what is accomplished by this invention involves transforming of each of the receiver generated voltages (that are directly proportional to the acoustic signals received) into the time pulses which have a duration that is a logarithmic function of the peak amplitude of the subject voltage.

In FIGURE 1 there is illustrated a system for carrying out this invention that is shown in block diagram form. The receiver 20 which carries the caption "Receiver #1," and likewise the receiver 21 which carries the caption "Receiver #2" are both shown schematically as crystals. From each receiver there is an electrical circuit path that includes an amplifier 25 for the signals from receiver 20, and similarly an amplifier 26 for the signals from receiver 21. Each of the signal amplifiers is connected at the output thereof to a gating circuit 27 and 28 respectively, so that each amplifier output is gated to pass only the first half cycle of the voltage representing the acoustic signal that is generated by each of the receivers 20 and 21. The details of the circuits of blocks 27 and 28 are shown in FIG. 2.

The gated first half cycle signal in each case is applied so that the peak voltage will charge an output capacitor 31 or 32 respectively for each of the gating circuits 27 and 28. The peak voltage is thus stored for a sufficient time period to provide for transformation of this voltage amplitude into a logarithmically related time period, which transformation is carried out in a manner to be described below.

The output circuit of each gating circuit 27 and 28 is connected to a principal electrode of a silicon controlled rectifier 35 or 36 respectively via a resistor 37 or 38 in each case. At a predetermined time following the transmission of an acoustic pulse into the formation from transmitter 12, a signal is applied simultaneously to both of the silicon controlled rectifiers 35 and 36 via circuit connections 41 and 42 respectively, as shown. When these simultaneous pulses are applied to the controlled rectifiers, they are conditioned to pass current and will thus discharge each of the capacitors 31 and 32 commencing simultaneously over the illustrated discharge paths that include the resistors 37 and 38. The discharge paths also include the controlled rectifiers 35 and 36 as well as Zener diodes 43 and 44 respectively in each case. These discharge paths thus lead to ground or a grounded circuit while the voltage developed across the Zener diode 43 or 44 in each case is applied to the input of a following circuit element that will be described more fully below. In this manner each silicon controlled rectifier 35 and 36 develops a substantially square wave pulse having a form like that illustrated by a wave form 47 and 48 respectively.

By employing a matched pair of silicon controlled rectifiers 35 and 36 so that they both will cut off current flow therethrough at the same current level, an output pulse in each case created by the current flow over the indicated path, will be created. Each such output pulse will have a time duration which is a logarithmic function of the amplitude of the voltage that was stored on each of the capacitors 31 and 32. These pulses are illustrated adjacent to the block diagram circuits as has been indicated above in connection with wave forms or pulse symbols 47 and 48.

In each of a corresponding pair of block diagram elements 51 and 52, the time duration pulse 47 or 48 respectively is received at the input and is transformed by differentiating, inverting and clipping so as to create a single output pulse from each block that reprsents the trailing edge of the pulse 47 or 48 in each case. These trailing edge pulses are indicated in the drawing by a corresponding pair of pulse symbols 53 and 54 respectively. It will be observed that the outputs of elements 51 and 52 are connected in common by being joined to a common input connection 57 that leads into a time measuring circuit 58.

It will be appreciated that pulses 53 and 54 do not occur simultaneously unless the amplitudes of the receiver generated signals (i.e. the stored voltage amplitudes) are identical. This is because the time pulse transformation arrangement employing the silicon controlled rectifiers, creates in each case a pulse having a time duration which is a logarithmic function of the signal amplitude and because these time pulses are generated simultaneously so that the leading edges will coincide while the trailing edges will have a time difference dependent upon the related amplitude difference of the voltages. Consequently, it will be appreciated that at the input of the time measuring circuit 58 there will be introduced in sequence the two pulses 53 and 54 which have a time difference equal to the difference in the time duration of the two pulses 47 and 48.

Time measuring circuit 58 may take any convenient form, e.g. that disclosed in U.S. Patent No. 2,931,455 issued April 5, 1960, and referred to above, or that disclosed in U.S. Patent No. 3,118,127. The output of the time measuring circuit will thus be a D.C. voltage that is proportional to the time difference measured between the succeeding pulses as applied to the input. This D.C. voltage output signal is transmitted to a recorder 60 that will make a record of the time between pulses which may be calibrated in terms of the attenuation that occurred in the acoustic signal as it travelled a vertical distance in the formation corresponding to the distance between receiver 20 and receiver 21.

A feature of especial benefit in the invention is the transformation of a voltage amplitude to a time pulse, so that the results of the time measurement may be transmitted uphole along the cable with a minimum of difficulty. In other words, transmitting separate and distinct pulses without regard for amplitude or similar distortions, is relatively easy to accomplish over the long suspension cable involved. Such a long cable circuit creates many problems in attempting to transmit plain voltage amplitudes thereover. While the FIGURE 1 diagram has no indication of which elements in the system are to be physically located down hole in the logging tool and which are at the surface, it is preferred that the circuit connection 57 should be the cable circuit from the tool to the surface equipment. However, other arrangements of the physical equipment might, of course, be employed.

In addition, there is the added benefit to be had with this invention which lies in the fact that the output results may be directly calibrated in terms of decibels of attenuation since the logarithmic relationship exists in connection with the transformation from a voltage amplitude to a time pulse.

Proof of the fact that the transformation from a voltage amplitude (e.g. charge on capacitor 31) is one resulting in a time pulse (e.g. pulse 47) having a duration directly related to the logarithm of the amplitude of the voltage, may be had by observing the following relationship that exists where a given voltage is applied to a capacitor which is then discharged over a path containing a given resistance therein.

As derived from RC circuit theory, the following equation may be stated:

$$i = \frac{E_c}{R} \epsilon^{-\frac{t}{RC}} \quad (1)$$

In the foregoing equation the terms may be defined as follows: $i$=instantaneous current, $E_c$=initial capacitor voltage, $R$=resistance, $\epsilon$=Napierian base, $t$=time and $C$=capacitance.

In addition, from the same circuit theory the instantaneous voltage across a resistor may be expressed as follows:

$$e_R = iR = E_c \epsilon^{-\frac{t}{RC}} \quad (2)$$

Then by solving the foregoing expressions for the time involved in voltage decay the following expression may be reached using the steps indicated:

$$\frac{e_R}{E_c} = \epsilon^{-\frac{t}{RC}}$$

$$\log_\epsilon \frac{e_R}{E_c} = -\frac{t}{RC}$$

$$t = -RC \log_\epsilon \frac{e_R}{E_c} = RC \log_\epsilon \frac{E_c}{e_R} \quad (3)$$

Then taking $t_{a1}$ as the time required for $e_R$ to decay from $E_{c1}$ to $e_{R1}$, the following expression results:

$$t_{a1} = RC \log_\epsilon \frac{E_{c1}}{e_{R1}} \quad (4)$$

$E_{c1}$=initial capacitor voltage in a first case and,
Where:
$e_{R1}$=the instantaneous voltage across resistor R in a first and second case Similarly taking $t_{a2}$ as the time required for $e_R$ to decay from $E_{c2}$ to $e_{R1}$, the similar equation results:

$$t_{a2} = RC \log_\epsilon \frac{E_{c2}}{e_{R1}} \quad (5)$$

Where:
$E_{c2}$=initial capacitor voltage in a second case
Now by taking the difference in time between Equation 4 and Equation 5 we may express the time difference as $$\Delta t_a = t_{a1} - t_{a2} \quad (6)$$

The foregoing Equation 6 may then be solved as follows:

$$\Delta t_a = RC \left( \log_\epsilon \frac{E_{c1}}{e_{R1}} - \log_\epsilon \frac{E_c^2}{e_{R1}} \right)$$

$$\Delta t_a = RC \log_\epsilon \frac{E_{c1}/e_{R1}}{E_{c2}/e_{R1}}$$

$$\Delta t_a = RC \log_\epsilon \frac{E_{c1}}{E_{c2}} \quad (7)$$

Equations 4 and 5 may be restated:

$$t_{a1} = RC \log_e E_{c1} - RC \log_e e_{R1}$$
$$t_{a2} = RC \log_e E_{c2} - RC \log_e e_{R1}$$

but since $e_{R1}$ is a fixed quantity $RC \log_e e_{R1}$ is a constant, and may be called $k$ $$t_{a1} = RC \log_e E_{c1} - k$$

and $$t_{a2} = RC \log_e E_{c2} - k$$

The difference between these two equations thus gives Equation 7 again:

$$\Delta t_a = t_{a1} - t_{a2} = RC (\log_e E_{c1} - \log_e E_{c2})$$
$$= RC \log_e \frac{E_{c1}}{E_{c2}}$$

The above re-statement of Equations 4 and 5 shows that the time $t_a$ required for $e_R$ to decay to $e_{R1}$ is a logarithmic function of the corresponding initial capacitor voltage $E_c$, which is the voltage proportional to the peak amplitude of the selected portion of the signal generated by the respective receiver.

Consequently, it has been thus demonstrated that the difference in time periods required for decay to a given amplitude level is proportional to the logarithm of the ratio of the voltage amplitude levels. This means that the result (difference in time between the two periods) may be calibrated in terms of decibels of attenuation since it is known from acoustic logging theory that a constant times the logarithm of the ratio of two properly chosen acoustic signals taken from spaced apart receiver locations, is equal to the decibels of attenuation.

It will be appreciated that in place of employing silicon controlled rectifiers 35 and 36, equivalent elements such as gas tubes may be employed. In the event that a gas tube is used in place of a silicon controlled rectifier, the necessary circuit changes will, of course, be clear to anyone skilled in the art. Thus, where a gas tube is employed, the arrangement will be such that once current flow has commenced through the tube it will continue until a predetermined low level of current flow has been reached, at which time the tube will be automatically cut off. With the gas tube set up for the foregoing conditions, and additionally by having a control grid signal arranged to trip the gas tube so as to allow current flow to take place; the resulting arrangement will act in a substantially equivalent manner as has been described heretofore in connection with the action for each of the silicon controlled rectifiers.

In addition, it will be appreciated by those skilled in the art that the Zener diodes 43 and 44 are not necessary insofar as providing an output pulse having the required time duration is concerned. The only function of the Zener diodes is to act as a variable resistance bypass, which will reduce the amplitude of the leading edge of the pulse created and thus provide for a substantially square wave pulse instead of a pulse having a high amplitude leading edge and much lower amplitude trailing edge. Consequently, the Zener diodes 43 and 44 may be employed but are not indispensible, whether the time pulse circuit has its principal element a silicon controlled rectifier or some effectively similar element such as a gas tube with proper circuit controls associated therewith.

Referring now to FIGURE 2, the circuit shown partially in block form is one that may be employed for the gating circuit element 27 or 28 of the FIGURE 1 system. Such gating circuit includes gating control signals which may be derived from the acoustic logging circuitry involved in the total system and which forms no part per se of this invention. However, by employing similar terminology here as was used in the Loofbourrow Patent No. 2,931,455, the derivation of these terms may be found if desired. Thus it will be understood that the timing pulses employed here may be substantially the same as those pulses shown and described in the Loofbourrow patent. For controlling the gate here, a gate opening pulse $t_d$ is introduced over a circuit connection 66 to actuate a bistable multivibrator 67; and a second control pulse (indicated by the caption $t_1$) will be introduced over another input circuit connection 68, to actuate the multivibrator 67 once more which will return it to its first state. This action of multivibrator 67 will provide a control pulse over an output circuit illustrated that includes a resistor 69 and a variable resistor 70, shown in series with the B— supply circuit for the multivibrator 67. In this manner an output pulse which is indicated by a schematic symbol 73, will be created and transmitted over a circuit connection 74 that leads to a grid electrode 75 of a triode tube 76.

The tube 76 acts as the gate for passing a predetermined early portion of the acoustic generated signal that is being transmitted. This gated early portion of the signal, in turn, is used for charging a capacitor in accordance with the peak amplitude of the signal. In this manner, during the time between the initial and final portions of the pulse 73, i.e. between time $t_d$ and time $t_1$, gate tube 76 is conditioned so as to allow passage of a signal therethrough. By reason of the circuit arrangement for tube 76, the signals will pass only so long as the signal has the proper polarity as will appear hereafter.

The acoustic generated signal that is to be gated is received at an input terminal 80 and passes through a polarity reversing element 81 to provide the proper polarity for passing the first half cycle thereof through the gate tube 76. Then the signal is amplified a predetermined amount in an amplifier 82 after which the signal is transmitted via a capactior 83 to the grid of a triode tube 84 that is connected as a cathode follower. The output of the cathode follower tube 84 then is carried via a capacitor 87 to the plate circuit of tube 76 in the illustrated manner which includes a resistor 88. The tube 76 has a plate electrode 89 that acts as one of the principal current flow electrodes. The other principal current flow electrode of tube 76 is a cathode electrode 90. It will be observed that plate 89 is connected directly to one end of resistor 88 which is the same end thereof as has capacitor 87 connected thereto. Cathode 90 is connected directly to another resistor 91 that has the other end thereof grounded. There is a circuit connection 92 for transmitting the gated signal to another amplifier 95. The output of amplifier 95 is carried via a circuit connection 96 to a two stage peak reading vacuum tube voltmeter 97 and the output of the peak reading voltmeter is carried over the illustrated circuit connection 98 that leads directly to one side of a capacitor 99. It will be appreciated that capacitor 99 in FIGURE 2 will be the capacitor 31 (FIGURE 1) or the corresponding capacitor 32 (FIGURE 1) if the gating circuit system illustrated in FIGURE 2 is employed in the FIGURE 1 system.

FIGURE 3 illustrates the wave form of a typical signal with an indication of its characteristics following amplification thereof but prior to the gating for passing only the first half cycle. Thus, FIGURE 3 shows a signal wave form 104 which has an initial first half cycle having an amplitude as indicated by the caption $a_1$, but with a negative voltage characteristic in accordance with the illustrated diagram. It will be observed that this signal after having its polarity reversed will be applied to the cathode follower 84 in form substantially like the inverse of that illustrated in FIGURE 3. Then by reason of the gating action of triode 76, only the first half cycle (having an amplitude of $a_1$) is allowed to pass through the gate so that the voltage output of the gate circuit may be represented, as illustrated, by a pulse symbol 105 in FIGURE 2.

It is to be noted that with the circuit arrangement of gate tube 76, only signals having the required polarity will pass therethrough and this insures the passage of only the first half cycle of the acoustic generated signal which is that desired to pass through for charging a capacitor, e.g. capacitor 99, in accordance with the peak voltage thereof. This desired unidirectional signal action is obtained because the triode 76 acts as a diode insofar as the signals passing through the path including the principal electrodes, is concerned. That is, during the time when the gating pulse 73 is applied to the grid 75.

It will be appreciated by anyone skilled in the art that the intial time, or rise portion of gating control pulse 73 is controlled by a pulse indicated with the caption $t_d$ that may be generated at a predetermined time following the generation of the transmitter pulse in the acoustic logging system. This time interval will be arranged so as to insure that the gate will be open when the first energy is received at the receiver in question, and then this particular gate closing time may be predicated on the arrival of the second half cycle of the initial acoustic energy. Such ending time of the gate control pulse 73 is that represented by the pulse that is captioned $t_1$ as indicated, and such timing pulse may be created in accordance with the arrangement more fully described in the aforementioned Loofbourrow patent.

Figure 5:
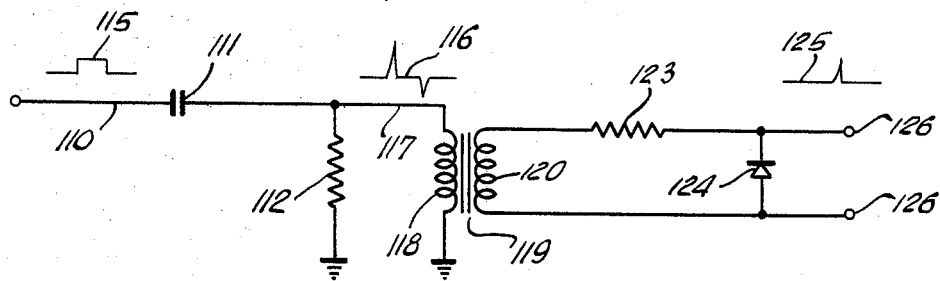
FIGURE 5 is a schematic electrical circuit diagram illustrating typical elements that may be employed in another two corresponding blocks of the elements shown in FIGURE 1.

Referring to FIGURE 5, it is pointed out that there is here illustrated a simplified circuit diagram which shows the elements that are included in either of the circuit elements 51 or 52 shown in FIGURE 1. Thus as pointed out above, each of the block shown elements 51 and 52 includes the required circuit elements for differentiating, inverting and clipping the output signal from each of the silicon controlled rectifiers 35 and 36 respectively. It will be understood that the circuit employed may include more refined as well as additonal elements, but that the basic elements for carrying out the three indicated steps may take the form illustrated in FIGURE 5. There is shown an input circuit connection 110 leading to a capacitor 111 that has a resistor 112 connected from the other side thereof to ground. This portion of the circuit acts to provide the desired differentiation so that the input signal which had generally a square wave pulse form as illustrated by a symbol 115, will take the form shown by a symbol 116, after differentiation. This differentiated signal which then exists across the resistor 112 is applied via a circuit connector 117 to one side of a primary winding 118 on a transformer 119. The other side of the winding 118 is grounded, as indicated, to complete the circuit. The transformer 119 then acts as an inverter in the well known manner of transformers so that from the output of a secondary winding 120, the differentiated and inverted signal is passed via a series resistor 123 to a clipper that is in the form of a diode 124. The diode 124 acts to remove (by short circuiting) the first or leading edge portion of the differentiated signal 116, so that the final output is like that represented by a symbol 125 that will be passed on to or exists at, a pair of output terminals 126.

From the foregoing it will be clear that the output of each of the two channels connected to receiver #1 and receiver #2 illustrated in FIGURE 1, will take the form of a single short duration pulse representing the trailing edge of the time duration pulse, e.g. 47 or 48 that is created in each case as a direct measure of the time period which is a linear function of the logarithm of the amplitude of the acoustic generated signal. Consequently by having a common connection 57 as has been shown and described in connection with FIGURE 1, there will exist two separate pulses having a time spacing between them; and this time spacing represents the difference in time duration of the two time period pulses which each represent the indicated logarithm related signal that is based upon the amplitude of a predetermined early portion of the acoustic generated signal in each case.

It is to be especially noted that one of the advantages of this invention lies in the fact that by transforming a voltage amplitude into a pulse having the time duration thereof logarithmically related to the voltage amplitudes, the transformation involves a storage of the voltage (as a charge on a capacitor) so that the transformation may take place at any reasonable time after the voltage in question has been stored. By reason of this fact the determination of the time duration pulse may be carried out at a later time than the instant when acoustic velocity signal data is received. Consequently the information concerning attenuation of the acoustic signals may be determined at the same time as or simultaneously with the acoustic velocity data, insofar as having a logging operation carried out by a single logging tool is concerned. In other words, it is not necessary to run a separate log for determining attenuation, since by reason of the nature of the attenuation operation employed in connection with this invention, the attenuation data is available during each of the acoustic velocity determination cycles at a given delay time after the velocity data, so that as a continuous log for acoustic velocity is carried out the attenuation data from that very same logging information may be determined continuously at the same time.

While a preferred embodiment of the invention has been described above in considerable detail in accordance with the applicable statutes, this is not to be taken as in any way limiting the invention but merely as being descriptive thereof.

We claim:

1. In an acoustic logging system for use in a borehole: means for developing respective electrical signals in response to acoustic energy received at a vertically spaced pair of receivers in the borehole, said electrical signals each having a series of alternations; first and second electrical channels connected to said pair of receivers respectively, each of said channels comprising first circuit means for producing a voltage proportional to the peak amplitude of the first half cycle of said electrical signal; second circuit means for converting said voltage into a pulse having a time duration which is a logarithmic function of the peak amplitude of said voltage; said second circuit means including means for initiating said pulse in each channel simultaneously; and third circuit means connected to said pair of channels for measuring the time difference between the trailing edges of said pulses; said time difference between said pulses being proportional to the attenuation of the acoustic energy at the vertically spaced receivers in said borehole.

2. The invention according to claim 1, wherein said trailing edge time difference measuring means comprises means for differentiating and clipping said pulses to produce a short duration pulse coincident with the trailing edge of each of said pulses, and means for measuring the time interval between said trailing edge coincident pulses.

3. The invention according to claim 2, further including means for recording said time difference measurement so as to indicate the acoustic attenuation between said vertically spaced receivers in terms of decibels.

4. A method of making an attenuation type measurement of earth strata comprising the steps of generating acoustic energy at a source, receiving the acoustic energy at points spaced from the source and from one another within the earth, converting said acoustic energy arriving at each of said spaced apart points into electrical signal variations selecting corresponding portions of each of said electric signals and providing a value corresponding to the amplitude of each selected corresponding portion, translating with the same predetermined time constant each of said amplitude values into respective finite pulses each having a length which is a logarithmic function of the respective amplitude value, and measuring the difference in length of said respective finite pulses, said difference measure being proportional to the logarithm of the ratio of the amplitude values which is a measure of the attenuation expressed in decibels.

5. A method of making an attenuation type measurement of earth strata, comprising the steps of generating acoustic energy at a source, receiving the acoustic signals at points spaced from the source and from one another within the earth, converting said acoustic energy received at each spaced apart point into corresponding electrical signal alternations, selecting a corresponding early alternation of each of said electric signals and storing a value corresponding to the peak amplitude of said early alternation, simultaneously translating with the same predetermined time constant each of said stored peak amplitude values into respective finite pulses each having a time duration which is a logarithmic function of the respective stored peak amplitude value, and measuring the difference in time duration between said respective finite pulses, said difference measure being proportional to the logarithm of the ratio of the stored peak amplitude values which is a measure of the attenuation expressed in decibels.

6. A method according to claim 5, wherein said difference measure proportional to the difference in time duration between said respective finite pulses is obtained by providing a measure of the difference in time between the trailing edges of the respective finite pulses.

7. A method according to claim 6, wherein the difference measurement between the trailing edges of the respective finite pulses is recorded.

8. A method according to claim 5, wherein said step of selecting a corresponding early alternation of each of said electric signals includes the step of gating so that only the first half cycle alternation is selected.

9. A method according to claim 6, wherein providing a difference measure between the trailing edges of the respective finite pulses includes the further steps of differentiating and clipping said finite pulses to produce a short duration pulse coincident with the trailing edges of each of said finite pulses, said time difference measurement being made between a predetermined pair of said trailing edge coincidence pulses.

10. A method of logging a well bore comprising the steps of generating acoustic energy in the earth surrounding said well bore, receiving said acoustic energy sequentially at a first and second location, converting said received acoustic energy into corresponding electric variations the amplitude of which are indicative of the strength of the acoustic energy received at the respective first and second location, selecting a portion of said electrical signal including a first half cycle, storing a measure of the peak amplitude of the first half cycle of said respective electric signals, simultaneously initiating production with the same time constant of a pair of finite pulses each having a time duration which is a logarithmic function of the peak amplitude of said respective stored measure, and providing an indication of the time difference between said pair of finite pulses which time difference is proportional to the logarithm of the ratio of the stored peak amplitude measures.

11. A method of logging a well bore comprising the steps of generating acoustic energy in the earth surrounding said well bore, receiving said acoustic energy sequentially at a first and second location, converting said received acoustic energy into corresponding electric variations the amplitude of which are indicative of the strength of acoustic energy received at the respective first and second locations, gating corresponding early portions of said electric signals so that only a first alternation of each of said electric signals is passed, storing a voltage proportional to the peak amplitude of each of said first alternations of said electric signals on respective condensers, simultaneously initiating the discharge of said condensers, said discharge taking place with the same RC time constants, terminating said discharge when the discharge reaches the same predetermined voltage level, providing a short duration pulse coincident with the time at which said discharge reaches said predetermined voltage level, and measuring the time difference between short duration pulses, thereby providing a signal proportional to the logarithm of the ratio of the stored peak amplitude measure which value can be expressed in decibels of attenuation.

References Cited by the Examiner

UNITED STATES PATENTS

| | | | |
|---|---|---|---|
| 2,914,669 | 11/1959 | Wright et al. | 328—101 |
| 2,931,455 | 4/1960 | Loofbourrow | 181—.5 |
| 3,102,251 | 8/1963 | Blizard | 340—18 |

OTHER REFERENCES

Sarbacher, Dictionary of Electronics and Nuclear Engineering, Prentice-Hall, Inc., Englewood Cliffs, New Jersey, 1959, p. 550 relied on.

BENJAMIN A. BORCHELT, *Primary Examiner.*

CHESTER L. JUSTUS, SAMUEL FEINBERG,
*Examiners.*

V. J. DIPIETRO, R. M. SKOLNIK, *Assistant Examiners.*